J. R. FLANNERY, B. E. D. STAFFORD & E. I. DODDS.
STAY BOLT FOR BOILERS.
APPLICATION FILED FEB. 21, 1917.
1,285,097.
Patented Nov. 19, 1918.
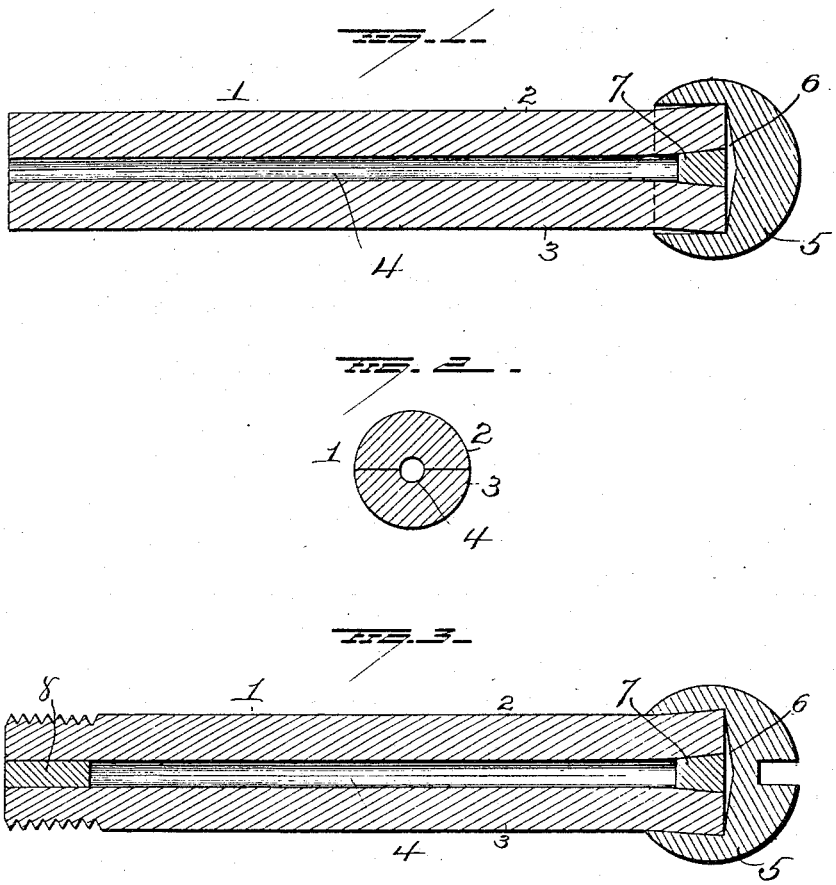

UNITED STATES PATENT OFFICE.

JOHN ROGERS FLANNERY, BENJAMIN E. D. STAFFORD, AND ETHAN I. DODDS, OF PITTSBURGH, PENNSYLVANIA, ASSIGNORS TO FLANNERY BOLT COMPANY, OF PITTSBURGH, PENNSYLVANIA.

STAY-BOLT FOR BOILERS.

1,285,097.  Specification of Letters Patent.  Patented Nov. 19, 1918.

Application filed February 21, 1917. Serial No. 150,200.

*To all whom it may concern:*

Be it known that we, JOHN R. FLANNERY, BENJAMIN E. D. STAFFORD, and ETHAN I. DODDS, citizens of the United States, and residents of Pittsburgh, in the county of Allegheny and State of Pennsylvania, have invented certain new and useful Improvements in Stay-Bolts for Boilers; and we do hereby declare the following to be a full, clear, and exact description of the invention, such as will enable others skilled in the art to which it appertains to make and use the same.

This invention relates to improvements in staybolts for boilers, and more particularly to such as are known in the art as flexible staybolts,—one object of the invention being to so construct a staybolt having a continuous bore forming a tell-tale hole extending throughout that portion of the bolt between the boiler sheets, that said bolt may be made of members welded together and be provided with a head without interfering with the continuity of the tell-tale hole through the body of the bolt from its bearing at the outer boiler sheet to its bearing at the inner boiler sheet, when the head is being applied to the bolt.

With this and other objects in view, the invention consists in certain novel features of construction and combinations of parts as hereinafter set forth and pointed out in the claims.

In the accompanying drawings; Figure 1 is a longitudinal sectional view of a partially completed staybolt exemplifying our invention; Fig. 2 is a transverse section; Fig. 3 is a sectional view of the completed bolt.

The body 1 of the bolt may comprise mated members 2, 3 welded together and so formed as to provide a continuous bore 4 extending longitudinally through said body of the bolt from end to end thereof and forming a tell-tale hole for the bolt.

The head 5 of the bolt is made separate from the body and is formed with a cylindrical socket 6 to receive one end of the body of the bolt. Before assembling the body 1 and the head 5, a conical plug 7 is driven into the bore of the body 1 (the end of the latter preferably having been heated) so as to expand the metal at the end of said body and render said end somewhat conical in form. This plug also serves to permanently close the bore at the headed end of the bolt.

When the conical end of the bolt body shall have been inserted into the cylindrical socket 6 in the head as shown in Fig. 1, the peripheral metal of the head which surrounds the socket 6, will be compressed with the use of a suitable tool or machine and be thus spun onto the conical end portion of the bolt body. The head will then be securely fastened to the bolt body and the end of the bore will be closed within the head of the bolt, as shown in Fig. 3.

If desired, the bore or tell-tale hole 4 may be closed at the inner end of the bolt where the latter passes through the inner boiler sheet, by means of a temporary plug 8 for the purpose of preventing the entrance of dirt and cinders into the tell-tale hole. The plug 8 may consist of graphite or other suitable material which can be readily removed with the use of a suitable tool when it is desired to examine the condition of the bolt.

Having fully described our invention what we claim as new and desire to secure by Letters-Patent, is:—

1. A staybolt for boilers, comprising a body portion having an expanded end portion, and a head having a socket receiving the expanded end portion of the body, and said head being rigidly secured on said expanded end portion of the body of the bolt.

2. A staybolt for boilers, comprising a tubular body having one end expanded, and a head having a socket into which the expanded end of the tubular body enters, said head tightly embracing the expanded end of the tubular body.

3. A staybolt for boilers, comprising a body portion having a longitudinal bore, a plug entering one end of said bore whereby the end of the body will be expanded and the end of the bore permanently closed, and a socketed head receiving said plugged and expanded end portion of the body and permanently fixed to the latter, the socket in said head conforming to the peripheral contour of the expanded portion of the bolt body.

4. A staybolt for boilers, comprising a body portion having a longitudinal bore extending from end to end thereof, said body portion having an expanded end portion, a plug in said expanded end portion permanently closing one end of said bore, and a socketed head receiving said expanded end portion of the bolt body and tightly compressed thereon.

In testimony whereof, we have signed this specification in the presence of two subscribing witnesses.

JOHN ROGERS FLANNERY.
BENJAMIN E. D. STAFFORD.
ETHAN I. DODDS.

Witnesses:
F. H. ALLISON,
EDWIN S. RYCE.